March 14, 1950 M. L. MADLEN 2,500,900
APPARATUS FOR FILM-TYPE DISTILLATION
Filed Nov. 21, 1946 2 Sheets-Sheet 1

Inventor
Marshall L. Madlen
By Ernest K Bean
Atty

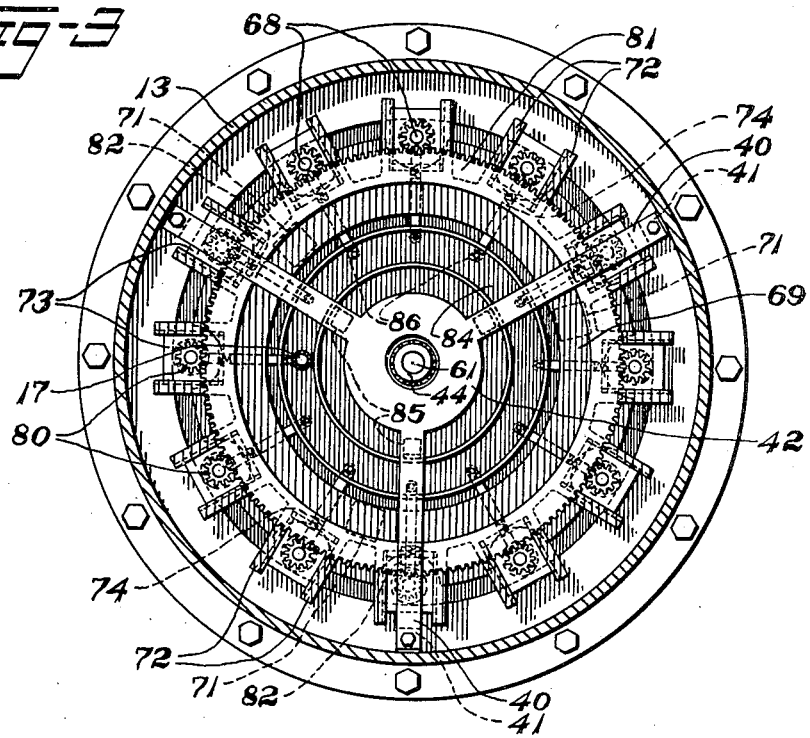
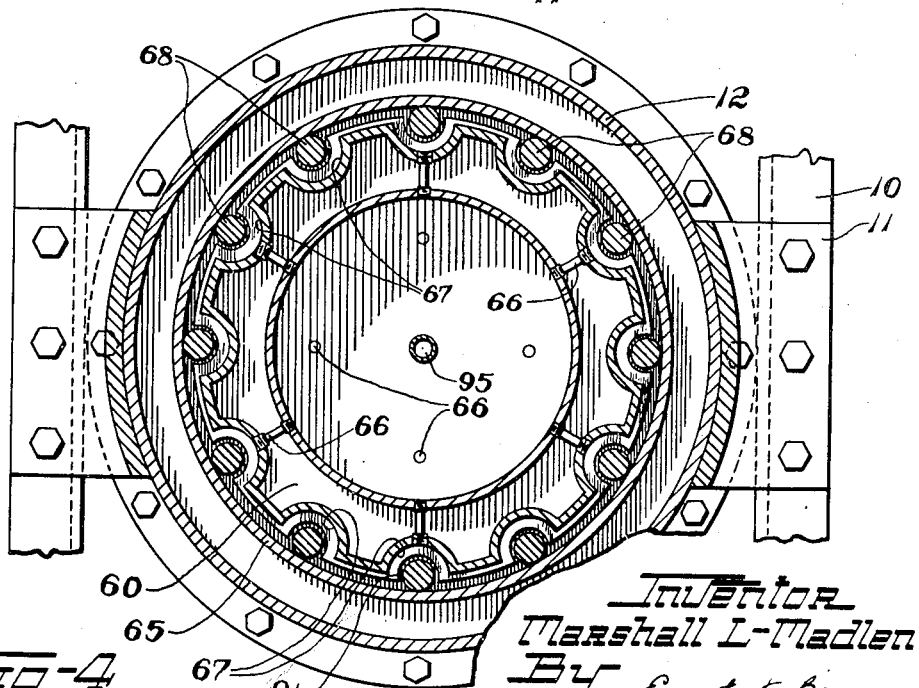

Patented Mar. 14, 1950

2,500,900

UNITED STATES PATENT OFFICE 2,500,900

APPARATUS FOR FILM-TYPE DISTILLATION

Marshall L. Madlen, Avon Lake Village, Ohio, assignor to The B. F. Goodrich Company, New York, N. Y., a corporation of New York Application November 21, 1946, Serial No. 711,312

5 Claims. (Cl. 202—205)

This invention relates to distillation methods and apparatus. More particularly the invention relates to apparatus for film-type distillation in which the distillate flows upon an evaporation surface in a relatively thin film and is subjected to distillation in the spread-out condition, the distillate being collected from a condensing surface.

Heretofore many forms of apparatus for film-type distillation have been proposed. Several forms of this equipment have found use as laboratory analytical tools and others have been used in the distillation of vitamin oils and other pharmaceuticals in rather limited amounts. The fact that no successful industrial adaptation of film distillation has been made for distillation of low-cost materials in the heavy chemical field is indicative of serious limitations on such equipment from practical engineering and economic viewpoints. Some of the limitations are: extravagance in the use of heat and power, difficulties of adaptation to all metal designs, difficulty in operation and rather limited output capacity when measured against conventional type stills.

It is therefore an object of the present invention to provide methods and apparatus for a film-type distillation which will not be possessed of the above-mentioned defects but which will be adaptable to the separation and purification of a wide range of materials with greater capacity, economy and ease. Another object of this invention is to provide film distillation apparatus which will be possessed of novel means of spreading distilland upon the evaporation surface without interfering with the relatively close spacing desirable between the evaporation and condensing surfaces. These and other more detailed objects will appear in the description and discussion to follow.

To facilitate an understanding of the invention, certain phases of film-type distillation will first be briefly discussed and analyzed. Distilling molecules travel from the distilland film to the condensing surface in four stages, the last three of which may be said to occur practically in one continuous movement. The stages are:

(1) Diffusion of the volatile molecules from the body of the distilland to the surface thereof.

(2) Projection of the volatile molecules from the surface of the distilland into the vapor space adjacent the distillate.

(3) Movement of the volatile component across the vapor space or gap to the condensing surface.

(4) Condensation of the volatile molecules on the condensing surface.

Stage (1) takes place very slowly in oils, waxes, greases and many other naturally occurring or chemically prepared mixtures of chemical compounds. In such materials progress of the volatile molecules toward the surface of the distillate is opposed by the heavy or more inert molecules of the mixture to such an extent that distillation is very slow when natural diffusion is relied upon to bring the volatile molecules to the surface for distillation. The diffusional process of stage (1) represents one of the most serious limitations on the output capacity of film-type distillation equipment.

The rate at which volatile molecules are transferred across the vapor gap representing travel from stage (2) to stage (4) is a function of many variables, some of which are: vapor gap distance, absolute pressure above the distilland and the quantity of residual gas between the surfaces, the size and activity of the distilling molecules, temperature of the evaporation and condensing surfaces, and surface conditions at both surfaces. Some of these variables, particularly the absolute pressure above the distilland and the quantity of residual gas between the surfaces, as well as the temperature of the evaporation and condensing surfaces and the surface conditions at both surfaces, are susceptible of variation to meet the demands of each material to be distilled in manners well known to the art.

It has been disclosed in the copending application of Waldo L. Semon, Serial No. 591,960, filed May 4, 1945, now Patent 2,460,602, that the limitations imposed on the film distillation operation by the diffusional process of stage (1) may be minimized and, in practical effect, eliminated by subjecting the film of distilland on the evaporation surface to repeated re-distribution effected by a calendering operation performed, in a preferred embodiment, by means of a series of rolling rods or the like, which continuously roll over and calender the film of distilland on the evaporation surface. The calendering rolls or rods repeatedly and successively pick up and re-distribute the film of distillate and so renew its surface as rapidly as it is depleted of the more volatile molecules, with the result that the capacity and efficiency of the still are multiplied many times.

I have now discovered that the limitations imposed on the film distillation operation by the limitations necessary to the vapor gap may be further minimized by recessing the rolling rod into the condenser surface so as to bring the condensing surface and the evaporation surface into closer proximity. Thus, the rolling rods may be brought into contact with the evaporation surface, yet the evaporation surface and condensing surface may be spaced relatively closely together with the rolling rod making rolling contact with the evaporation surface. The film of distilland is repeatedly picked up and renewed so that the more volatile molecules are present in the surface and may easily escape into the gap between the two surfaces and since the vapor gap is very narrow, the tendency of the distilled molecules to return to the distilland surface is minimized.

In a preferred installation having a continuously annular evaporation surface surrounding a centrally disposed concentric condensing surface, a distributing means may take the form of a plurality of round rods circumferentially spaced apart at the evaporation surface and making rolling contact therewith, the rods desirably being supported in rotatable annular supporting rings so as to provide a squirrel-cage-like structure. In a preferred form of the present invention, especially in a very large still, the rolling rods may be provided with spring-loading so as to ensure contact of the rods against the evaporation surface and to reduce further the distill and film thickness. The condenser ordinarily must rotate with the cage to enable the several rods to roll circumferentially over the evaporation surface to distribute and continuously re-distribute the distillate uniformly over the entire evaporation surface in a thin film. However, the condenser and rods may be stationary and relative motion between the rods and the evaporation surface may be effected by rotating the evaporation surface.

The invention will now be described in greater detail with reference to the accompanying drawing showing certain preferred embodiments thereof. Of the drawing:

Fig. 3 is a sectional view taken along the line 2—2 of Fig. 1.

Fig. 4 is a sectional view taken along the line 3—3 of Fig. 1.

Figures 1, 2:
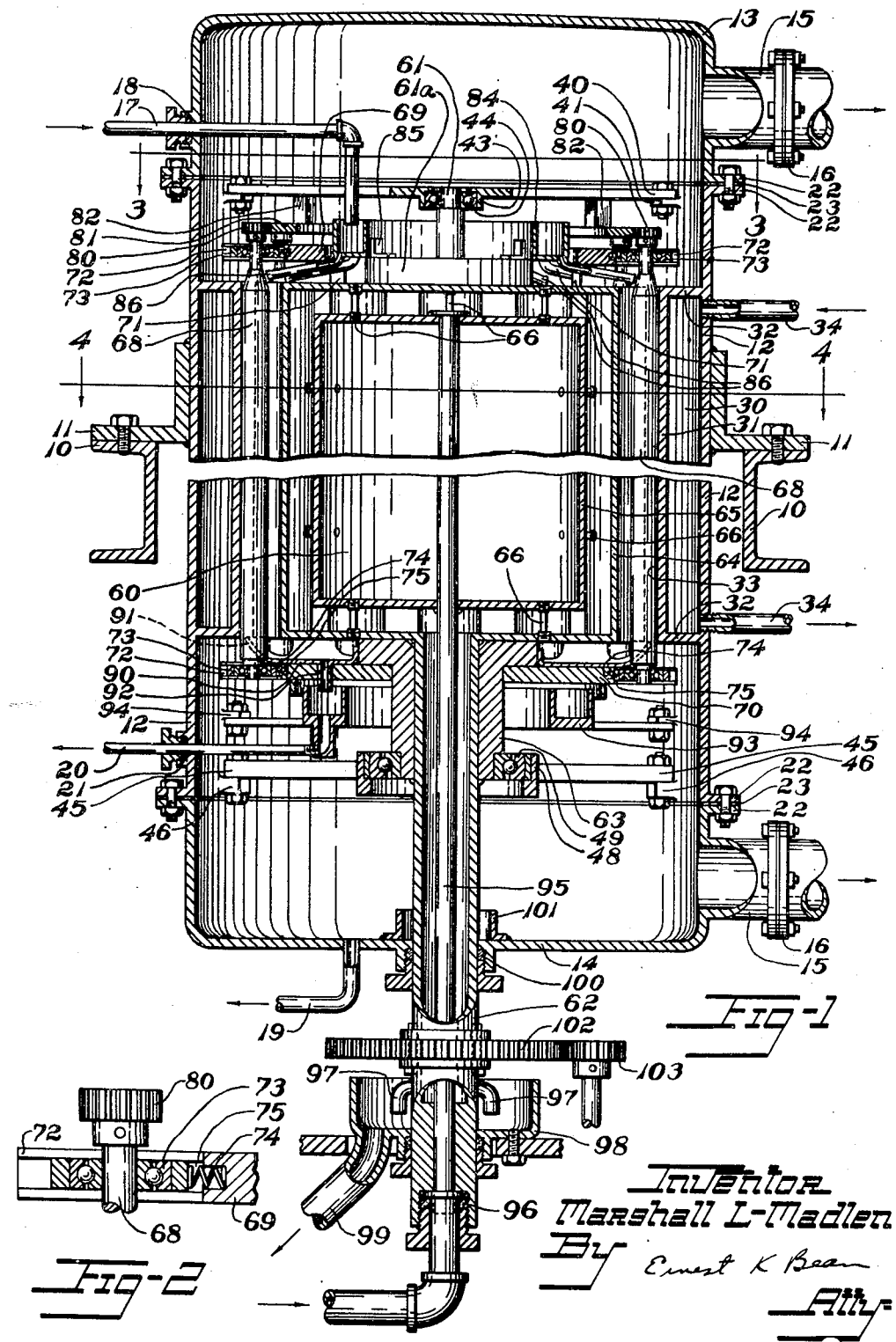
Fig. 1 is an elevation in section showing the preferred apparatus for film-type distillation including rolling rod means for calendering and re-distributing the distillate and showing in particular the manner of disposition of the rollers to permit closer spacing of the evaporation and condensing surfaces.
Fig. 2 is an enlarged partial sectional view more clearly showing the manner of spring loading of the rollers of the rolling rod distributing means.

The preferred type of film distillation equipment shown in Figs. 1 to 4 is desirably mounted in a substantially vertical position in any convenient manner as by supporting it on a framework comprising C-shaped channel iron 10, 10 by angle iron brackets, 11, 11 welded to the side of the outer shell of the main body portion 12 of the still. The outer shell of the still comprises the main body portion 12, a top cap or dome 13 and a bottom cap 14. The top cap 13 and the bottom cap 14 are provided with large vacuum take-off pipes 15, 15, which are connected by means of the flange couplings 16, 16 to any known means for producing high vacuum, usually of the order of 1 to 10 microns (0.001 to 0.01 mm. Hg). A distill and delivery or inlet pipe 17 passes through the top cap 13 through a vacuum seal 18. The still bottom cap 14 is provided with a residue take-off pipe 19 and a distillate take-off pipe 20, the distillate take-off pipe 20 being surrounded by a vacuum seal 21. The various sections of the still are joined together by vacuum-tight joints comprising flanges 22, 22 on the still body sections and gaskets 23, 23 between the flanges 22, 22.

The space within the main body portion 12 of the still is divided into a jacketing space 30 and a cylindrical distillation chamber by a concentric annular inner wall 31 and welded bottom and top headers 32, 32. The inside surface 33 of the wall 31 serves as an evaporation surface which may be heated to any desired temperature by circulating steam or heated "Dowtherm" or other suitable heating medium through the jacketing space, the heating medium entering and leaving the jacket by means of pipe connections 34, 34.

At the top of the main still body section 12 there is disposed a top condenser supporting spider 40 which is supported from the body section 12 by three supporting brackets 41, 41 welded to the body section 12. The hub 42 of the spider is provided on the underside with an integral bearing retaining shoulder 43 in which is disposed a ball bearing 44. At the bottom of the main still body section 12 there is disposed a bottom condenser supporting spider 45 which is supported on three supporting brackets or lugs 46, 46 welded to the inside of the shell 12. The hub of the spider 45 is possessed of a shoulder or bearing retaining recess 48 which serves to retain a semi self-aligning ball thrust bearing 49.

A condenser 60 is supported within the evaporation surface 33 by means of shafts 61, 62 which are journalled, respectively, in the bearings 44, 49, the shaft 61 being secured to the top of the condenser 60 by means of a welded flange 61a and the shaft 62 being supported on the thrust bearing 49 by a thrust collar 63. The condenser 60 comprises an outer shell 64 and an inner shell 65 supported in spaced apart relationship one within the other by stay-bolts 66, 66.

In accordance with the invention, the outer shell 64 of the condenser 60 is provided with a plurality of circumferentially spaced-apart, groove-like recesses 67, 67 to receive a plurality of long roller rods 68, 68. The recesses are preferably shaped and proportioned that the rods may be disposed in the recesses, yet in contact with the evaporation surface, but with the space between the rods and the curved wall of the recess being the same as the space between the condensing surface and the evaporation surface. In this manner the distillation taking place from the surface of the rods is of the same amount and general character as the distillation taking place on the evaporation surface.

The rolling rods 68, 68 are disposed in the recesses 67, 67 and are supported by an annular roller supporting ring 69 at the top of the condenser and by another supporting ring 70 at the bottom of the condenser. The ring 69 is supported on and secured to the top of the condenser by three blocks 71, 71, (two of which appear in Fig. 1). The bottom rod supporting ring 70 is welded to the thrust collar 63 so as to rotate with the condenser 60. Thus, the rods 68, 68 and the rings 69, 70 form a squirrel-cage-like device which is freely rotatable with the condenser 60, but out of contact therewith.

In order to permit the free escape of non-condensable gases from the vapor gap into the top region of the still where it may be removed from the still, the rod supporting rings 69, 70 are provided with outwardly projecting arms or forks 72, 72 in which the rods 68, 68 are supported. Thus an open space is provided between each pair of rods through which the non-condensables may pass on their way to the vacuum take-offs. The rods are mounted in individual ball bearing blocks 73, 73 which are slidably mounted in the forks 72, 72 so as to be free to move outwards under the urging of coiled springs 74, 74. The springs 74, 74 are mounted in recesses 75, 75 at the base of the forks 72, 72 so as to be under compression when the rods 68, 68 are in contact with the evaporation surface 33. By providing springs of the desired resiliency and strength it is possible to exert sufficient pressure upon the rolls in order to insure intimate contact of the rolls with the evaporation surface and to adjust the thickness of the distilland film in order to obtain the most efficient distillation conditions.

In order to insure rotation of each rod as it rolls over the evaporation surface, means are provided for positively driving each rod. Each of the distributor rods are provided at the top end with individual pinion gears 80, 80 which mesh with a ring gear 81. The ring gear 81 is supported from and secured to the top spider 40 by means of a plurality of small blocks 82, 82 so as to be immovably supported above the rolling rods of the distributor. Thus, the rolling rods are individually driven as the condenser and rods are rotated within the evaporation surface.

In order to insure even distribution of the distilland about the distillation surface and to prevent overheating of the distilland by contact with heated surfaces before distillation begins, a distilland distributing device is provided which delivers the distilland to the top of the rollers from whence it is transferred to the distillation surface. The distalland is delivered to the interior of the still through the delivery pipe 17 from whence it is discharged into an annular distributor pan 84 which rests upon and secured to the flange 61a by means of a plurality of small angle brackets 85, 85. From the distributing pan 84, the distilland is conducted to the projecting top ends of the individual rods by means of individual delivery pipes 86, 86 which pass under the rod supporting ring 69 to reach the rods.

The residue remaining on the evaporation surface after the distilland reaches the bottom of the still drops off the rods and the evaporation surface and is collected in the still bottom, from whence it leaves the still through the residue take-off pipe 19.

Since the distillate collected on the evaporation surface must be kept pure and free from mixture with the residue dropping off the evaporation surface, special provisions must be made for its collection and separate removal from the still. In the apparatus shown in Fig. 1, a distillate collection pan 90 is provided immediately beneath the condenser. The outer lip 91 of the distillate collecting pan is made to extend about half-way into the vapor gap to insure collection of the distillate. The outer lip 91 of the collecting pan 90 is curved about each rod and and thereby closely follows the shape of the condenser 60. The pan 90 is secured to the thrust collar 63 and rests upon the bottom rod supporting ring 70 so as to be rotatable therewith. From the pan 90, the distillate drops through a short pipe 92 to drop into a stationary annular trough 93 which is supported from the main body section 12 of the still body by brackets 94, 94. The distillate is withdrawn from the trough 93 through the distillate take-off pipe 20.

Due to the rotation of the condenser, special means for introducing the coolant to the condenser is necessary. The shaft 62 is hollow and is provided with an internal pipe 95 or conduit which extends up the axis of the condenser and is turned down over the top of the inner shell. Thus, water entering through the inner pipe 95 flows over the top of the inner shell of the condenser and returns down the annulus between the condenser shells. Thus, the lowest temperature cooling water is available at the top of the condenser where the greatest amount of distillation takes place. At the lower end of the shaft 62 the water inlet is connected to the inner pipe 95 through a rotary seal arrangement 96. The water escapes from the annulus between the shaft 62 and the inner pipe 95 through a plurality of short curved delivery pipes 97, 97 and thence to a circular collection trough 98 from which it is withdrawn through a water take-off pipe 99.

The rotating shaft 62 enters the still body through a vacuum-tight rotary seal 100 in order that the still body may be efficiently evacuated to very low pressures of the order of 6 to 10 microns or less. A residue retaining shoulder 101 is provided which prevents entry of the residue to the seal 100.

The unitary structure comprising the condenser and the rolling-rod distilland distributing device with the accompanying equipment for delivery of the distilland to the evaporation surface and for collection and removal of the distillate is rotated within the evaporation surface by means of a gear-drive mechanism comprising a sprocket gear 102 on shaft 62 and a driving gear 103 which is actuated by any source of motive power such as an electric motor not shown.

Unlike prior film distillation equipment, the above-described apparatus may be constructed throughout of steel or other appropriate low-cost, high-strength engineering material so as to provide not only a more efficient still but also a less expensive and more rugged and durable still capable of use on a true commercial basis, rather than merely on a semi-laboratory basis as has been the case in the past.

In operating the still of the present invention, the vacuum is applied to the still and the heating medium is turned on. Heating and evacuation are continued until the desired temperature is reached on the evaporation surface and until the desired absolute pressure between the evaporation and condensing surfaces is attained. The distilland, which in the usual case will have been previously subjected to high-vacuum stripping and de-gassing, is introduced to the still through the delivery pipe 17. The distilland so delivered is received by the annular distributing pan 84 from which the distilland flows to the individual distributor rods through pipes 86, 86. As the distilland flows down the evaporation surface, it is picked up by the rollers and carried around the circumference of the evaporation surface as tiny banks of distilland pushed ahead of the several rollers while being continually spread in a characteristic calendering operation.

The film of distalland undergoes progressive distillation as it progresses down the evaporation surface while being repeatedly re-distributed by successive rollers. At the bottom end of the evaporation surface, distillation has progressed to a point where only a residue remains which has been depleted of the more volatile molecules.

The residue drips off the edge of the evaporation surface 33 and off the rollers 64, 64, and drops into the still bottom and flows from the still through the residue take-off pipe 19.

The distilled molecules are condensed on the condensing surface of the condenser 60 and flow down the condenser to the distillate collecting pan 90, thence through the pipe 92 to the distillate take-off trough 93 and out of the still through the distillate take-off pipe 20 for storage in a vacuum-tight receiver tank (not shown).

It is ordinarily necessary to de-gas the distilland before attempting vacuum distillation of the material. Liquids under usual conditions contain quantities of entrapped or dissolved non-condensable gases such as air and absorbed volatile liquid such as water and solvents which, when the material is heated while spreading in a thin film under vacuum, will boil out of the film and seriously overload the vacuum-producing apparatus. Further, the non-condensables frequently will erupt out of the film so explosively as to "splash" or throw impure distilland across the vapor-gap thereby contaminating the distillate with the higher boiling impurities of the distilland. The still of the present invention has been found to be exceedingly efficient as a de-gasser for conducting a preliminary film distillation on a mixture of oily materials. In utilizing the present apparatus for the de-gassing distillation rather than the final distillation, the fractions of undistilled residue and of distillate may be run together after one pass through the still and then re-cycled through the same still or preferably, a second similar unit in series for further distillation.

In operating the still, it will be appreciated that small rolling banks of distilland are maintained in front of the several rolling rods as they advance around the evaporation surface, and that each of the rods continuously and progressively bites off small quantities of distilland from its bank and feeds it under the roller so as to spread and smooth it over the evaporation surface. In this respect the rolling rods function like the rolls of a coating calender. This calendering action reduces the thickness of the distilland film to such a degree that volatile molecules can escape freely from the surface of the film instead of being trapped below its surface and subjected to super-heating and consequent violent flash vaporization and heat decomposition. The better separation thus attained, furthermore, results in a better opportunity for fractionation.

Because of the exceeding thinness of the distilland film and the repeated renewal and re-distribution on the evaporation surface as well as over the surface of the rollers themselves, vaporization proceeds at a much higher rate, and at the same time, thermal decomposition of heat-sensitive materials is minimized since the materials remain at elevated temperatures for a much shorter time than in conventional film-type stills.

Moreover, from consideration of the distillation rate obtainable with a still of this invention it is evident that the presence of the rolling rod distributor mechanism in the vapor gap does not reduce the effective area available for evaporation. From this it is seen that distillation is taking place from the distilland-covered rods. Thus, it is highly desirable that the vapor gap between the surface of the rolling rod and the curved wall of the recess in the condenser surface be very nearly the same as the gap between the condensing and evaporation surfaces to prevent splashing and contamination of the distillate.

Since the rolling rods of the still of this invention are in a preferred embodiment urged outwardly by the springs as well as by centrifugal force, the film of distilland on the evaporation surface is exceedingly thin and distillation proceeds at a higher rate and with less splashing and erupting as occurs in film distillation from thicker films. The thinness of the film of distilland and its repeated renewal and re-distribution also result in greatly increased heat transfer from the evaporation surface to the distilland film. This increased heat transfer is reflected in a greatly increased thermal efficiency and an increased output capacity. A still of the type illustrated in the accompanying drawings having the rolling rod distributor recessed into the condenser surface has both a thermal efficiency and an output capacity of several hundred per cent or more greater than the best published data for prior forms of falling film stills.

Furthermore, because the rolling rods of the distilland distributor are recessed into the outer shell 64 of the condenser, the evaporation and condensing surfaces of the still of this invention may be brought into closer proximity in spite of the roller distributing mechanism disposed between the surfaces. If it were not for the recessing of the rollers, the evaporation and condensing surface could not be brought closer together than the diameter of the rolling rod (see Fig. 3 of the drawing). As a result of the reduction in the vapor-gap in the still of the present invention the range of the materials which may be distilled is increased because of shorter vapor-gap and consequent lower distillation temperature.

The still of the present invention will efficiently distill a wide variety of materials, among which are crude dioctyl-phthalate, butyl phthalate, benzyl phthalate, oleic acid, vegetable oil fatty acids, p-isoheptyl diphenylamine, glycol dioleate, olive oil, lubricating oil and other heavy petroleum fractions, coconut oil, tricresyl phosphate, and countless other materials. Tests also indicate that the present still will handle many other materials not ordinarily thought to be capable of distillation.

The rolling rod distributor of this invention may be applied to any of the so-called "falling film" stills, either the hot-core or cold-core type. It is preferred, however, to use the rolling rod distributor on the "cold-core" type of still, as illustrated in the drawing, for it is in this type that the full measure of the benefits of the rolling rod distributor can be most effectively realized. It will also be appreciated that the rolling rod distributor of this invention may be applied to hot and cold core stills having evaporation and condensing surfaces of varied configurations and dispositions.

The still of this invention is simple and automatic in operation. The rolling rod distributor is positive in action, making visual control unnecessary in operation of the still. With the rolling rod distributor, it is highly improbable that the distilland will gather in rivulets or channels on the evaporation surface or leave deposits of charred material built up on the evaporation surface. In fact, the still when equipped with a rolling rod distributor is more or less self-cleaning.

While the invention has been described in detail with reference to operation under conditions of high vacuum of the order of 1 to 10 microns pressure (0.001–0.010 mm. Hg), I have found that advantageous results also may be obtained by distilling certain more volatile materials at pressures as high even as atmospheric pressure or higher. For example, acetone has been distilled in the present apparatus at atmospheric pressure and room temperature. It will accordingly be understood that the invention is not restricted to high-vacuum distillation, but may be used in conjunction with distillation at pressures as high even as atmospheric and higher pressures.

As has been indicated, detailed operating conditions such as temperature of the evaporation surface, temperature of the condensing, pressure in the space between the two surfaces, and distance between the two surfaces, etc., are not critical and will vary somewhat with different materials being distilled, all of which is well understood in the art.

While the methods and apparatus have been described in considerable detail and with reference to certain specific embodiments and adaptations, it should be understood that the invention is not limited thereto, and that variations and modifications therein may be made without departing from the spirit and scope of the invention as defined in the appended claims.

I claim:

1. In film distillation apparatus comprising a continuous, stationary annular evaporation surface and a continuous condensing surface arranged in vertically-disposed, radially spaced-apart relationship, and means for effecting a downward flow of a film of a distilland material on said evaporation surface, the combination of a plurality of grooves generally semi-cylindrical in shape disposed longitudinally in said condensing surface, a plurality of rotatable rollers disposed in said grooves of said condensing surface for circumferential travel between said surfaces and over said evaporation surface, the distance between said rollers and the grooved portion of said condensing surface being substantially the same as the distance between the evaporation surface and the condensing surface proper, upper and lower means for supporting said rollers and for maintaining said rollers in position in the said grooves in contact only with the said evaporation surface, and means for rotating said condensing surface and said rollers to cause said rollers to roll over said evaporation surface and distribute and redistribute said distilland material thereon.

2. Apparatus for film distillation comprising in combination within a vacuum-tight vessel, a vertically disposed cylindrical evaporation surface, a condensing surface arranged within said evaporation surface and in radially spaced-apart relationship therewith, means for heating said evaporation surface, means for cooling said condensing surface, a plurality of continuous grooves of generally semi-cylindrical shape disposed longitudinally in said condensing surface, a plurality of round rods rotatably disposed in said grooves and in contact only with said evaporation surface, the distance between said rods and the grooved portions of said condensing surface being substantially the same as the radial distance between said surfaces, upper and lower ring-like supporting members for rotatably supporting said rods in said grooves and forming an integral structure with said condensing surface, a gear on each of said rods, ring gear means engaging the said gears on the individual rods so as to effect positive rotation of the individual rods of said integral structure, means for effecting rotation of the said integral structure to cause said rods to roll over said evaporation surface, means for supplying a distilland material adjacent the top of said evaporation surface, means for removing distillate from the bottom of said condensing surface, and means for evacuating the space between said surfaces.

3. Apparatus for film distillation comprising in combination within a vacuum-tight vessel, a vertically disposed cylindrical evaporation surface, a condensing surface arranged within said evaporation surface and in spaced-apart relationship therewith, means for heating said evaporation surface, means for cooling said condensing surface, a plurality of round rods rotatably mounted in vertically disposed circumferentially spaced-apart relation between said surfaces for rolling contact with said evaporation surface, upper and lower means for rotatably supporting said rods in groove-like recesses in said condensing surface but out of contact therewith so as to form an integral structure therewith, gear means for rotating said integral structure about the central axis of said cylindrical evaporation surface, a gear on each of said rods, and ring-gear means engaging the said gears on the individual rods so as to effect positive rotation of the individual rods of the said integral structure, means for supplying distilland adjacent the top of said evaporation surface for flowing down said surface, means for withdrawing undistilled residue from said evaporation surface, means for withdrawing distillate from said condensing surface, and means for evacuating the space between said surfaces.

4. Apparatus for film distillation comprising in combination within a vacuum-tight vessel, a vertically disposed annular evaporation surface adapted to be covered with distilland, a condensing surface arranged in spaced-apart relationship therewith, a plurality of rollers arranged in circumferentially spaced-apart relation between said surfaces for rolling contact with the distilland covered surface, said rollers being deeply recessed in grooves in said condensing surface but separated from said condensing surface by a distance substantially equal to the distance between said evaporation and condensing surfaces, means in conjunction with said condensing surface for rotatably supporting said rollers and forming an integral structure with said condensing surface, spring means associated with said rollers and said integral structure for applying pressure between said rods and said evaporation surface, means for rotating said integral structure as a unit, and means for positively rotating the individual rollers as the integral structure rotates.

5. Apparatus for film distillation comprising in combination within a vacuum-tight vessel, a vertically disposed cylindrical evaporation surface, a condensing surface arranged within said evaporation surface and in spaced-apart relationship therewith, means for heating said evaporation surface, means for cooling said condensing surface, a plurality of round rods rotatably mounted in vertically disposed circumferentially spaced-apart relationship between said surfaces and in rolling contact with said evaporation surface, said rods being disposed in groove-like recesses in said condensing surface but out of contact therewith, upper and lower ring-like supporting members for rotatably supporting said rods in said recesses and forming an integral structure with said condensing surface, spring means associated with said rods and said rod-supporting members for applying pressure between said rods and said evaporation surface, a gear on each of said rods, and ring gear means engaging the said gears on the individual rods so as to effect positive rotation of the individual rods of the said integral structure, means for effecting rotation of the said integral structure as to cause the rods to roll over said evaporation surface, means for supplying distilland adjacent the top of said evaporation surface, means for withdrawing undistilled residue from said evaporation surface, means for removing distillate from said condensing surface, and means for evacuating the space between said surfaces.

MARSHALL L. MADLEN.

REFERENCES CITED

The following references are of record in the file of this patent:

UNITED STATES PATENTS

| Number | Name | Date |
| --- | --- | --- |
| 2,180,050 | Hickman | Nov. 14, 1939 |
| 2,403,978 | Hickman | July 15, 1946 |

OTHER REFERENCES

Quackenbush et al., "A Molecular Still of New Design," Ind. and Eng. Chem. Anal. Ed., vol. 15, pages 468–470 (1943).